(12) United States Patent
Yoshida et al.

(10) Patent No.: US 10,024,726 B2
(45) Date of Patent: Jul. 17, 2018

(54) TEMPERATURE SENSOR HAVING INTERMEDIATE MEMBER CONNECTING LEADS TO ELEMENT ELECTRODE WIRES EXTENDING FROM TEMPERATURE DETECTOR

(71) Applicant: DENSO CORPORATION, Kariya, Aichi-pref. (JP)

(72) Inventors: Kouichi Yoshida, Kariya (JP); Toshiya Ozeki, Kariya (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 15/129,982

(22) PCT Filed: Mar. 30, 2015

(86) PCT No.: PCT/JP2015/059897
§ 371 (c)(1),
(2) Date: Sep. 28, 2016

(87) PCT Pub. No.: WO2015/147320
PCT Pub. Date: Oct. 1, 2015

(65) Prior Publication Data
US 2017/0138796 A1    May 18, 2017

(30) Foreign Application Priority Data

Mar. 28, 2014  (JP) ................. 2014-069376

(51) Int. Cl.
*G01K 1/16* (2006.01)
*G01K 7/00* (2006.01)
(Continued)

(52) U.S. Cl.
CPC ................. *G01K 1/08* (2013.01); *G01K 7/16* (2013.01)

(58) Field of Classification Search
CPC .. G01K 1/14; G01K 1/08; G01K 7/00; G01K 2217/00; G01K 7/16; G01K 17/00
(Continued)

(56) References Cited

U.S. PATENT DOCUMENTS

| 5,718,455 A | 2/1998 | Kawaguchi et al. |
| 6,899,457 B2 * | 5/2005 | Kurano ................... G01K 7/22 338/28 |

(Continued)

FOREIGN PATENT DOCUMENTS

| JP | 2009-294107 | 12/2009 |
| JP | 2012-052959 | 3/2012 |

*Primary Examiner* — Gail Kaplan Verbitsky
(74) *Attorney, Agent, or Firm* — Nixon & Vanderhye PC

(57) ABSTRACT

A temperature sensor includes a temperature detector having a thermosensitive element, element electrode wires, leads, and intermediate members. The temperature sensor is formed such that ends of the element electrode wires are embedded in the temperature detector, the leads are electrically connected to the respective element electrode wires, and the intermediate members electrically connect the element electrode wires to the respective leads. Each element electrode wire and the corresponding intermediate member are arranged being aligned in the extending direction, and bonded to each other, with opposing surfaces facing each other being abutted each other. The intermediate member and the corresponding lead are juxtaposed in a direction perpendicular to the extending direction, and bonded being overlapped with each other.

10 Claims, 6 Drawing Sheets

(51) Int. Cl.
*G01K 7/16* (2006.01)
*G01K 1/08* (2006.01)

(58) Field of Classification Search
USPC ............................... 374/163, 179, 208, 185
See application file for complete search history.

(56) References Cited

U.S. PATENT DOCUMENTS

| | | | | |
|---|---|---|---|---|
| 6,979,121 | B2* | 12/2005 | Chang | G01K 1/18 |
| | | | | 374/163 |
| 7,997,793 | B2* | 8/2011 | Stone | G01K 13/002 |
| | | | | 374/164 |
| 8,702,305 | B2* | 4/2014 | Yokoi | G01K 7/22 |
| | | | | 338/22 R |
| 9,752,936 | B2* | 9/2017 | Nakanishi | G01K 1/08 |
| 9,787,047 | B2* | 10/2017 | Mori | H01R 43/28 |
| 2009/0323765 | A1 | 12/2009 | Yokoi et al. | |
| 2011/0228812 | A1* | 9/2011 | Suzuki | B23K 26/127 |
| | | | | 374/163 |
| 2013/0128925 | A1* | 5/2013 | Hoenicka | G01K 1/08 |
| | | | | 374/208 |
| 2013/0223479 | A1* | 8/2013 | Satou | G01K 1/12 |
| | | | | 374/163 |
| 2013/0235904 | A1* | 9/2013 | Toudou | G01K 7/16 |
| | | | | 374/185 |
| 2016/0178445 | A1* | 6/2016 | Shiraki | G01K 1/08 |
| | | | | 374/208 |

* cited by examiner

TEMPERATURE SENSOR HAVING INTERMEDIATE MEMBER CONNECTING LEADS TO ELEMENT ELECTRODE WIRES EXTENDING FROM TEMPERATURE DETECTOR

CROSS-REFERENCE TO RELATED APPLICATIONS

This application is the U.S. national phase of International Application No. PCT/JP2015/059897 filed Mar. 30, 2015, which designated the U.S. and claims priority to Japanese Patent Application No. 2014-069376 filed Mar. 28, 2014, the entire contents of each of which are hereby incorporated by reference.

BACKGROUND OF THE INVENTION

TECHNICAL FIELD

The present disclosure relates to a temperature sensor having a thermosensitive element.

BACKGROUND ART

For example, vehicles, such as automobiles, are each equipped with an exhaust gas purifier for purifying exhaust gas generated in the internal combustion engine of the vehicle. The exhaust gas purifier includes a temperature sensor that detects the temperature of the exhaust gas. Based on the temperature detected by the temperature sensor, exhaust emission is controlled and reduced.

For example, JP-A-2010-032493 discloses the following temperature sensor as a temperature sensor for use in an exhaust gas purifier. The temperature sensor disclosed in JP-A-2010-032493 includes a thermosensitive element for detecting temperature, a pair of element electrode wires extending from the thermosensitive element, and a pair of leads respectively electrically connected to the pair of element electrode wires. The pair of element electrode wires are formed of a platinum (Pt)-based alloy doped with strontium, with each being formed into a rod shape. The pair of leads are formed of a stainless alloy, with each being formed into a rod shape. The pair of element electrode wires are respectively bonded to the pair of leads by welding, being overlapped each other along a direction perpendicular to the axial direction thereof.

CITATION LIST

Patent Literature

Patent Literature 1: JP-A-2010-032493

However, the temperature sensor disclosed in JP-A-2010-032493 suffers from the following problems.

In the temperature sensor according to the patent literature mentioned above, the element electrode wires are overlapped with the respective leads, for laser welding. Due to laser welding, notches are created by a molten portion where each element electrode wire and the corresponding lead are bonded to each other, and portions around the molten portion, where the element electrode wire is not bonded to the lead. In each notch, stress is likely to concentrate in the vicinity of a tip end (of the molten portion).

The material used for the element electrode wires has a thermal expansion coefficient different from that of the leads. In particular, when the element electrode wires are bonded to the respective leads in an axially wide area, the difference in the axial thermal expansion becomes greater and is likely to cause a large stress acting thereon. In recent years, exhaust gas temperature tends to increase with an increase in the output per unit displacement of an internal combustion engine for use in an automobile or the like. Thus, temperature sensors are in need of durability to further cope with temperature change.

SUMMARY

Hence it is desired to provide a temperature sensor that can reduce concentration of stress applied between element electrode wires and leads, and can improve reliability in heat resistance and vibration resistance.

An aspect of the present disclosure is a temperature sensor characterized in that the temperature sensor includes: a temperature detector including a thermosensitive element for detecting a temperature; a pair of element electrode wires made of a noble metal or a noble metal alloy, the pair of element electrode wires being formed so as to have respective ends embedded in the temperature detector and other respective ends extended in the same direction; a pair of leads made of an Ni (nickel)-based alloy or an Fe (iron)-based alloy, the pair of leads being formed so as to be electrically connected to the respective element electrode wires and extend in an extending direction of the respective element electrode wires; and a pair of intermediate members made of an Ni-based alloy or an Fe-based alloy, the pair of intermediate members being formed so as to electrically connect the element electrode wires to respective leads and extend in the extending direction.

In the temperature sensor, each of the element electrode wires and a corresponding one of the intermediate members are arranged being aligned in the extending direction, and bonded to each other in a state where mutually facing opposing surfaces are abutted with each other; and each of the intermediate member and a corresponding one of the leads are juxtaposed in a direction perpendicular to the extending direction and bonded being overlapped with each other.

In the temperature sensor, each of the element electrode wires and a corresponding one of the intermediate members are arranged in alignment with each other in the extending direction, and bonded in a state where the opposing surfaces are abutted each other. The opposing surfaces are respective ends of the element electrode wire and the intermediate member in the extending direction. The region for forming the bonding portion can be made small, compared with the case where the element electrode wire is bonded to the lead through an outer peripheral surface parallel to the extending direction. Thus, the thermal expansion difference between the element electrode wires and the respective intermediate members can be reduced, thereby reducing stress.

By making the region for forming the bonding portion small, the opposing surfaces of each element electrode wire and the corresponding intermediate member can be easily entirely bonded to each other. Thus, the bonding portion is formed only on the opposing surfaces. In other words, a portion where the element electrode wire is not bonded to the intermediate member is not formed around the bonding portion where the element electrode wire and the intermediate member are bonded to each other, and accordingly, no notch is formed. Therefore, concentration of stress can be reduced.

As described above, if the material forming the element electrode wires is different from that forming the intermediate members, stress can be reduced.

The leads and the intermediate members are both formed of a Ni-based alloy or an Fe-based alloy. In this way, forming the leads and the intermediate members with the same material, bonding therebetween can be easily performed and the bonding strength can be improved. Selecting materials having thermal expansion coefficients approximate to each other for the leads and the intermediate members, stress is reduced when thermal expansion is caused by change of temperature. Although a notch is formed in the bonding portion between each lead and the corresponding intermediate member, use of an Ni-based alloy or an Fe-based alloy of high strength for the intermediate members can improve reliability, coupled with the effect of making the thermal expansion coefficient small as stated above.

As described above, according to the temperature sensor, concentration of stress across each element electrode wire and the corresponding lead can be reduced, thereby improving reliability of strength on the temperature sensor.

DESCRIPTION OF DRAWINGS

Figure 1:
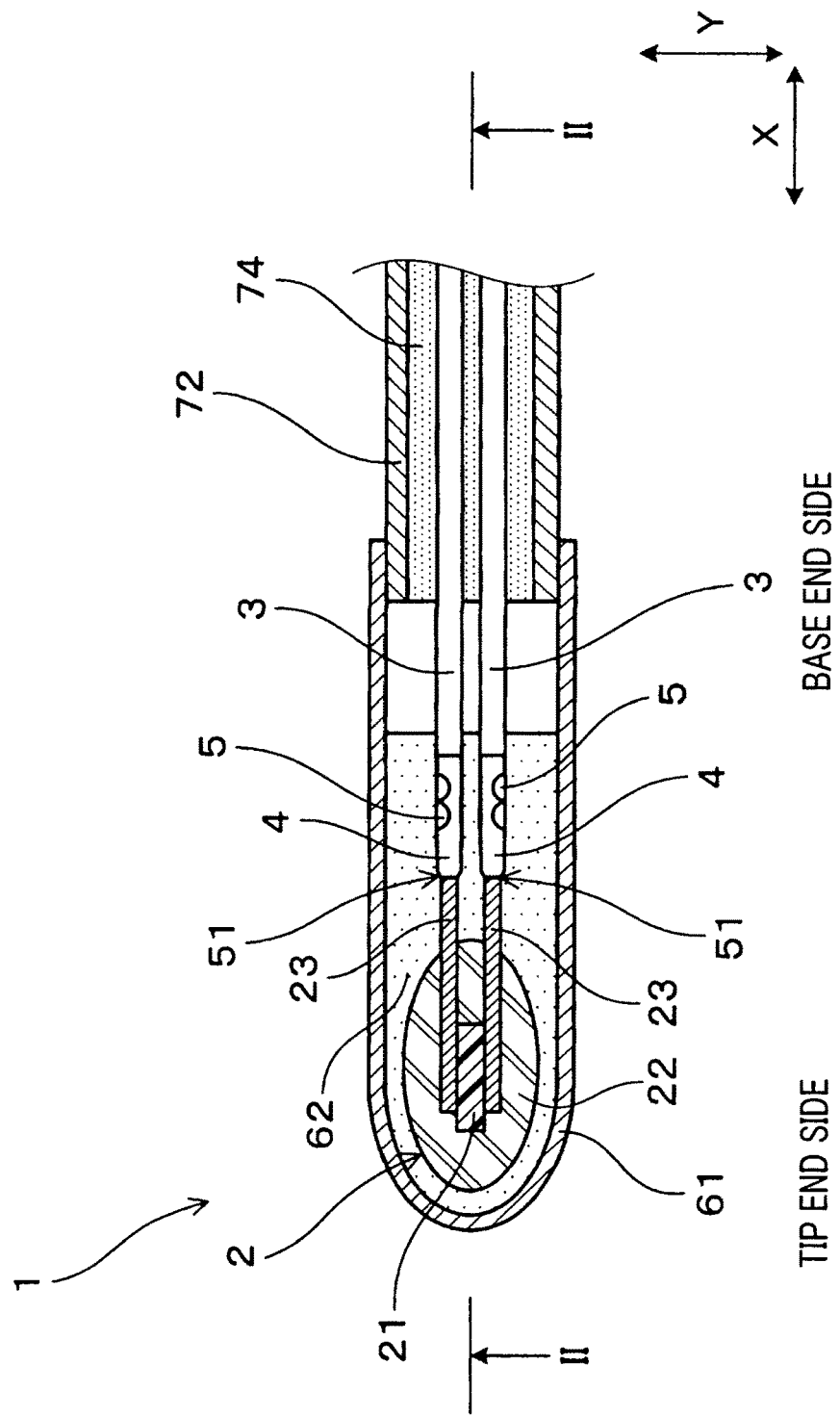
FIG. 1 is a partial cross-sectional view of a tip end of a temperature sensor according to a first embodiment.

In the above temperature sensor, it is preferable that the temperature detector is accommodated in a cover member; and the temperature detector and the cover member are secured by a filler filled in the cover member. In this case, if vibration is applied to the temperature sensor, the movement of the detector can be reduced, which leads to reducing stress applied to the element electrode wires, the intermediate members, and the leads.

It is preferable that, in the extending direction, a length L1 of a portion of each of the element electrode wires protruding from the temperature detector toward a corresponding one of the leads satisfies a relation $0.2 \text{ mm} \leq L1 \leq 8 \text{ mm}$. In this case, the stress applied to the electrode wires can be reduced when the detector vibrates, while the influence of dimensional variations in forming the temperature detector can be reduced. If the length L1 is 0.2 mm or less, depending on the dimensional variations in forming the temperature detector, respective end portions of the element electrode wires are located inside the temperature detector. This may cause thermal stress due to the thermal expansion difference between the temperature detector and the intermediate members and may damage the temperature detector. If the length L1 is longer than 8 mm, the distance from the temperature detector to the bonding portion between each element electrode wire and the corresponding intermediate member is too long. This may cause stress on the electrode wire and the bonding portion when the detector vibrates. In addition to this, in bonding each element electrode wire to the corresponding intermediate member by abutting them each other, the element electrode wire is likely to be bent, depending on the material of the lead.

It is preferable that, in the extending direction, an element side bonding portion bonding each of the element electrode wires to a corresponding one of the intermediate members is located at a position nearer the temperature detector than a tip end portion of a corresponding one of the leads is; and a distance L2 from the element side bonding portion to the tip end portion of the lead satisfies a relation $0 \text{ mm} \leq L2 \leq 8 \text{ mm}$. In this case, stress on the element electrode wires, the intermediate members, and the leads can be reduced. If the distance L2 is zero or less, each element electrode wire overlaps with the corresponding lead. Thus, when movement, such as vibration, occurs in the temperature detector, respective end portions of the leads may contact the respective element electrode wires, and thus stress acting on the element electrode wires may increase. If the distance L2 is longer than 8 mm, stress applied to the bonding portion bonding each intermediate member to the corresponding lead is increased when a movement, such as vibration, occurs in the temperature detector.

It is preferable that the pair of element electrode wires are formed of a Pt-based alloy doped with Rh (rhodium) or Ir (iridium). In this case, heat resistance and strength of the element electrode wires can be improved.

It is preferable that, in a cross section perpendicular to the extending direction, an outer shape of each of the intermediate members is greater than an outer shape of a corresponding one of the element electrode wires; and the outer shape of the intermediate member is large enough to cover the outer shape of the element electrode wire. If the element electrode wires are formed of the Pt-based alloy mentioned above, the melting point becomes higher than that of the intermediate members. Thus, in bonding the element electrode wires to the respective intermediate members, the intermediate members are likely to be molten and tapered. When the outer shape of each intermediate member is made large as described above, the opposing surfaces of each element electrode wire and the corresponding intermediate member are easily entirely bonded to each other, if the intermediate member is tapered.

[EMBODIMENTS]

(First Embodiment)

Referring to FIGS. 1 to 4, embodiments of the above temperature sensor will be described.

Figure 2:
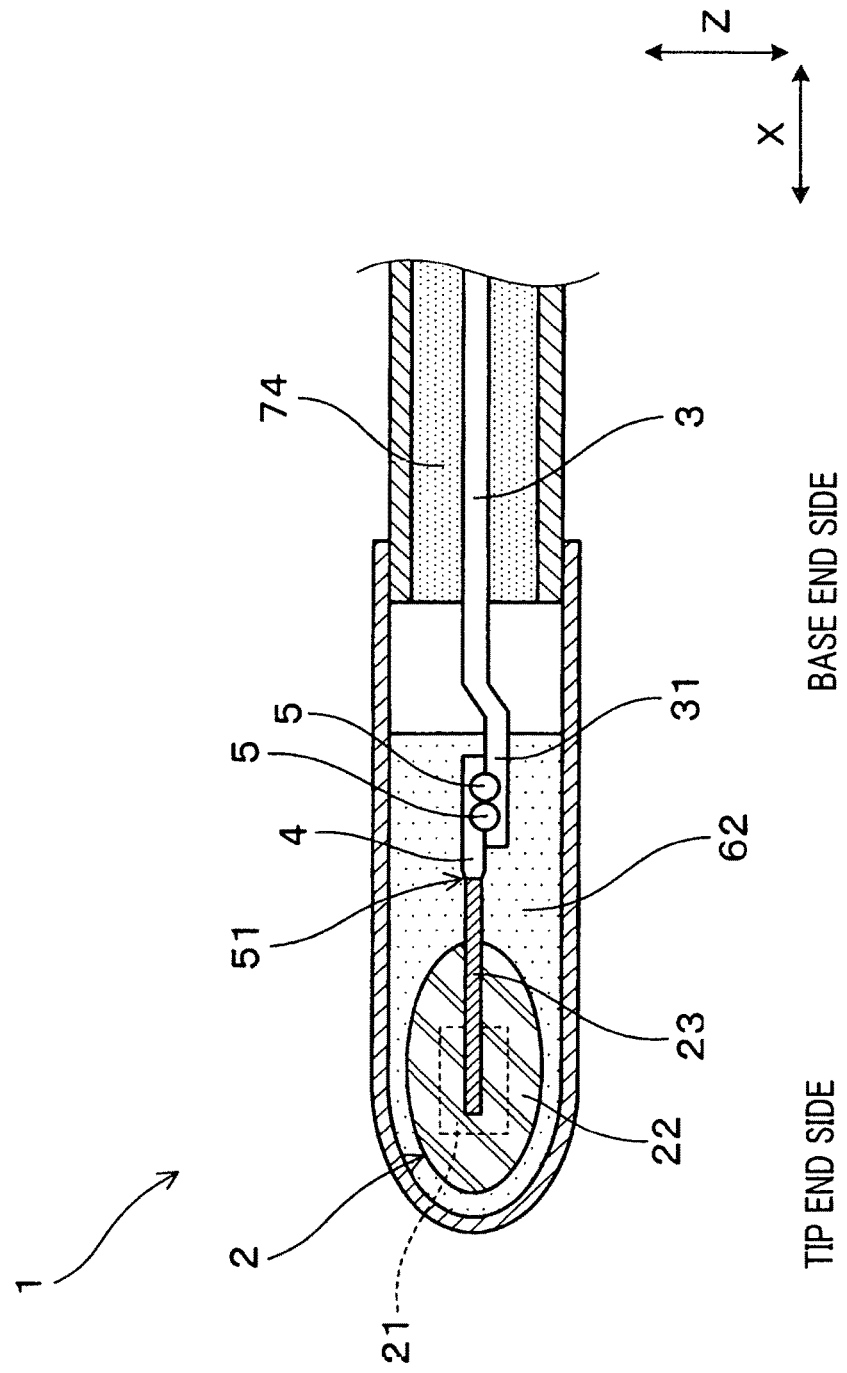
FIG. 2 is a cross-sectional view taken along arrow the line II-II of FIG. 1.

As shown in FIGS. 1 and 2, a temperature sensor 1 includes a temperature detector 2, a pair of element electrode wires 23, a pair of leads 3, and a pair of intermediate members 4.

The temperature detector 2 includes a thermosensitive element 21 for detecting temperature. The pair of element electrode wires 23 are formed of a Pt-based alloy and have respective ends embedded in the temperature detector 2 and respective other ends ensured to be extended in the same direction. The pair of leads 3, which are formed of an Fe—Cr (iron-chromium) alloy and respectively electrically connected to the element electrode wires 23, are ensured to be extended in an extending direction X of the element electrode wires 23. The pair of intermediate members 4, which are formed of an Fe—Cr alloy, electrically connect the element electrode wires 23 to the respective leads 3, and are ensured to be extended in the extending direction X.

Figure 4:
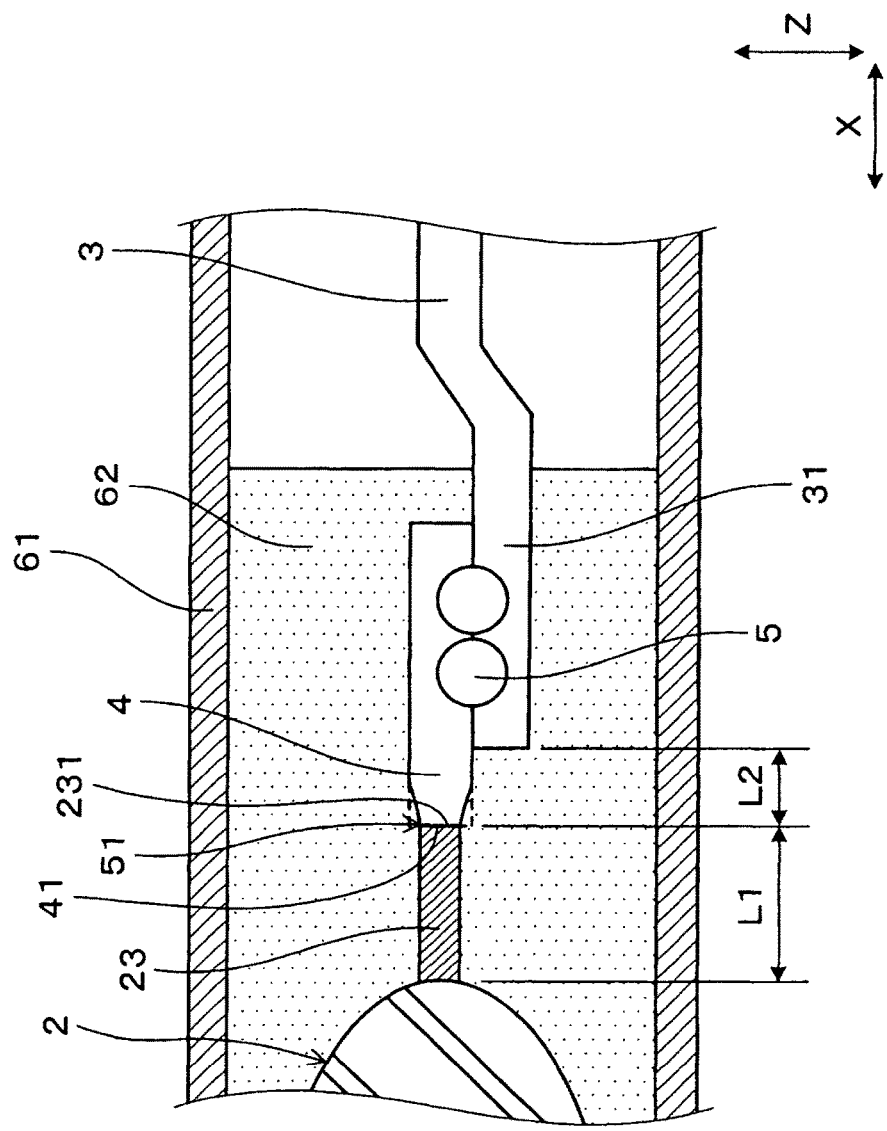
FIG. 4 is an enlarged cross-sectional view of part of the temperature sensor according to the first embodiment.

The element electrode wires 23 are aligned with the respective intermediate members 4 in the extending direction X. As shown in FIG. 4, each element electrode wire 23 is bonded to the corresponding intermediate member 4, with an opposing surface 231 being abutted against an opposing surface 41. The intermediate members 4 and the leads 3 are juxtaposed in a direction perpendicular to the extending direction X and bonded to each other, while being overlapped with each other.

Hereinafter, the temperature sensor 1 of the present embodiment will be more specifically described.

As shown in FIGS. 1 and 2, the present embodiment will be described, taking the side where the temperature detector 2 is arranged in the extending direction X of the element electrode wires 23, as a tip end side, and the side opposite to the tip end side, as a base end side. Also, the present embodiment will be described, taking the direction perpendicular to the extending direction X, i.e. the direction in which the pair of element electrode wires 23 are juxtaposed, as a lateral direction Y, and the direction perpendicular to the extending direction X and the lateral direction Y, as a vertical direction Z.

In an exhaust gas purifying system for purifying exhaust gas emitted from the internal combustion engine of an automobile, the temperature sensor 1 of the present embodiment is used for measuring the temperature of exhaust gas circulating in an exhaust pipe. The exhaust gas purifying system performs various processes according to the temperature measured by the temperature sensor 1.

Figure 3:
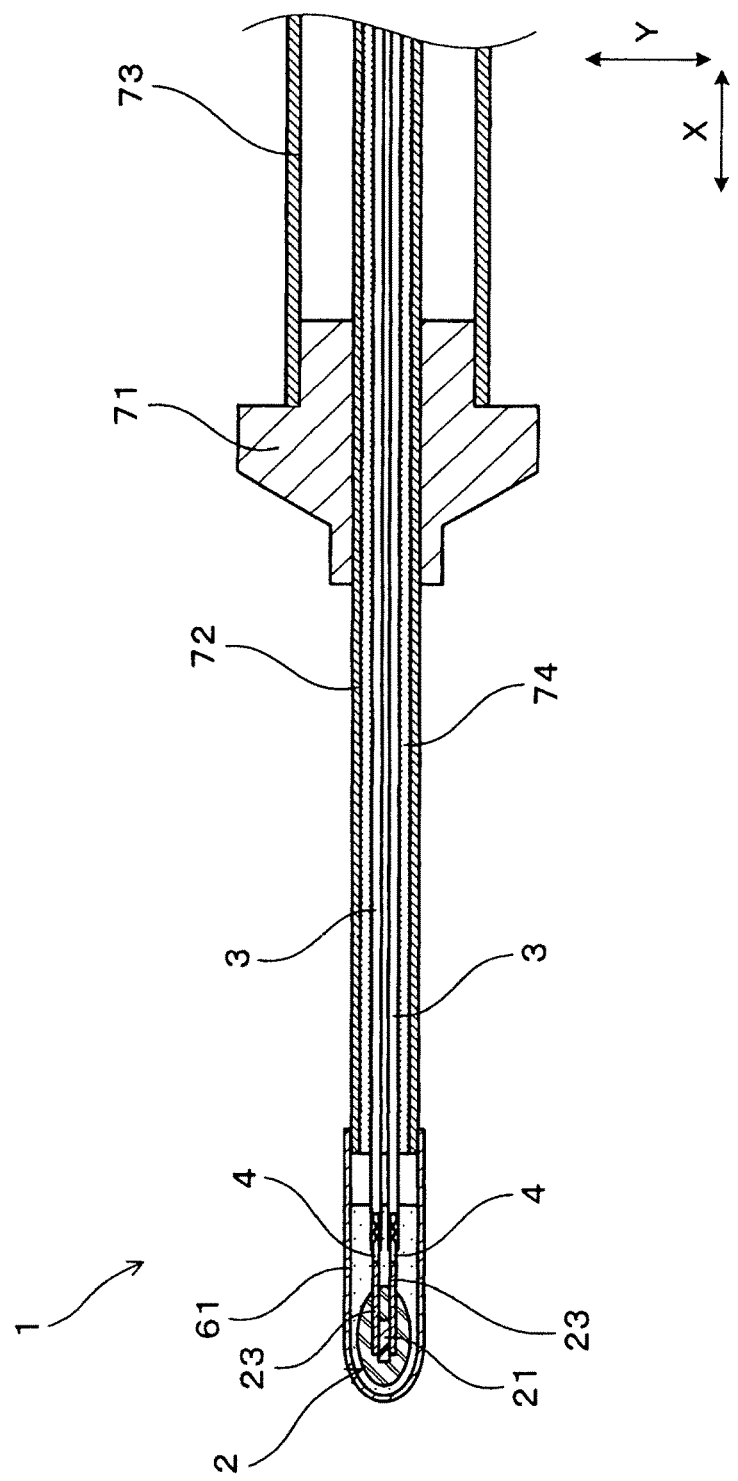
FIG. 3 is a cross-sectional view of the temperature sensor according to the first embodiment.

As shown in FIG. 3, the temperature sensor 1 has a mounting part 71 fixed to the exhaust pipe, a tubular member 72 inserted in and held by the mounting part 71, and a case member 73 extending from the mounting part 71 toward the base end side.

The tubular member 72 has a tubular shape extending in the extending direction X and has a tip end portion where a cover member 61 is arranged. The cover member 61 has a bottomed cylindrical shape, i.e. a shape whose one end is closed.

The pair of leads 3 are inserted and arranged in the tubular member 72. The pair of leads 3 each have a columnar shape extending in the extending direction X and each have a tip end where a connection terminal 31 is formed for connection to the corresponding intermediate member 4. As shown in FIGS. 2 and 4, the connection terminal 31 is arranged at a position displaced in the vertical direction Z from the center axis of the base end side lead 3. The pair of leads 3 have a base end where a connection terminal (not shown) is formed for connection to an external connection line of an external device. Between the pair of leads 3 and the tubular member 72, a main body filler 74 having electrical insulating properties is filled in to secure the pair of leads 3 in the interior of the tubular member 72, in a state where the pair of leads 3 are insulated from the tubular member 72. The tip ends of the pair of leads 3 are located at a position nearer the tip end side than the tubular member 72 is.

The pair of leads 3 are formed of an Fe—Cr alloy and have a thermal expansion coefficient E4 of $15 \times 10^{-6}$/K.

As shown in FIGS. 1, 2, and 4, the intermediate members 4 bonded to the respective connection terminals 31 of the pair of leads 3 are each in a columnar shape ensured to extend in the extending direction X. In a cross section perpendicular to the extending direction X, the outer shape of each intermediate member 4 is greater than that of the corresponding element electrode wire 23, that is, the outer shape of the element electrode wire 23 is large enough to cover the outer shape of the intermediate member 4. The intermediate members 4 are formed of an Fe—Cr alloy and have a thermal expansion coefficient E3 of $15 \times 10^{-6}$/K.

As an Fe-based alloy used for the pair of leads 3 and the pair of intermediate members 4, for example, materials that contain Fe as a base material and 11 to 26 wt % Cr can be used. In addition to Cr, Ni or Al (aluminum) may be contained. Examples of such an Fe-based alloy that can be used include Fe—Cr—Al, SUS310S, and the like. In this case, good heat resistance can be obtained at a high temperature of about 900° C. As an Ni-based alloy used for the pair of leads 3 and the pair of intermediate members 4, for example, materials that contain Ni as a base material and 14 to 25 wt % Cr can be used. In addition to Cr, Fe or Al may be contained. Examples of such a Ni—Cr alloy that can be used include NCF600, NCF601, and the like. In this case, good heat resistance can be obtained at a high temperature of about 1,000° C.

As shown in FIGS. 1, 2, and 4, the element electrode wires 23 extended from the temperature detector 2 are respectively connected to the pair of intermediate members 4.

The temperature detector 2 includes the thermosensitive element 21 formed of a resistance temperature detector and a sealing member 22 enclosing the thermosensitive element 21 and the tip end side of the pair of element electrode wires 23. The temperature detector 2 is covered with the cover member 61, while the temperature detector 2 and the cover member 61 are secured by a filler 62 filled in the cover member 61. The filler 62 is filled in the cover member 61 so as to be located from the tip end side of the temperature detector 2 up to a position closer to the base end side than bonding portions 5 are, the bonding portions 5 bonding the intermediate members 4 to the respective leads 3.

In the vicinity of the tip ends of the pair of element electrode wires 23, the thermosensitive element 21 is fixed in a state of being sandwiched between the pair of element electrode wires 23 that are parallel to each other. The thermosensitive element 21 and the pair of element electrode wires 23 are baked and bonded to each other in advance using a paste containing a noble metal which is doped with a glass frit. The thermosensitive element 21 and the tip end side portions of the pair of element electrode wires 23 baked and bonded to each other are enclosed by the sealing member 22 made of glass.

The pair of element electrode wires 23 are formed of a Pt-based alloy, and formed into a columnar shape extending in the extending direction X. The Pt-based alloy to be used contains Pt as a base material and is doped with 5 to 25 wt % Ir. In the present embodiment, the pair of element electrode wires 23 have a thermal expansion coefficient $E2=9 \times 10^{-6}$/K, which is substantially the same as a thermal expansion coefficient E1 of the thermosensitive element 21. The thermal expansion coefficient of the sealing member 22 is set so as to be the same as that of the thermosensitive element 21. The thermal expansion coefficients of the leads 3, the intermediate members 4, and the element electrode wires 23 satisfy a relation $E2 \leq E3 \leq E4$.

Next, bonding of the element electrode wires 23, the intermediate members 4, and the leads 3 will be described.

First, the pair of element electrode wires 23 extending from the temperature detector 2 are respectively bonded to the pair of intermediate members 4. The element electrode wires 23 are respectively arranged being aligned with the intermediate members 4. The element electrode wires 23 are bonded to the intermediate members 4 by butt welding so that each of the opposing surfaces 231 abuts against the corresponding one of the opposing surfaces 41. Thus, prior to bonding the intermediate members 4 to the leads 3, the intermediate members 4 are bonded to the element electrode wires 23. This way of bonding can facilitate an alignment process of arranging the intermediate members 4 in alignment with the respective element electrode wires 23. If the intermediate members 4 are firstly bonded to the leads 3, it is necessary to simultaneously perform alignment between the pair of intermediate members 4 and the pair of element electrode wires 23, making the centering process difficult. Such a difficult alignment process greatly varies welding in the manufacture and leads to a difficulty of ensuring reliability of welding, which may lead to a failure in bonding the pair of element electrode wires 23 to the pair of intermediate members 4. Another structure that can be considered is obtained by bonding the pair of element electrode wires, the pair of intermediate members, and the pair of leads in alignment with each other for bonding, or arranging the pair of element electrode wires and the pair of leads in alignment with each other for direct bonding. However, the alignment process in these structures is also difficult.

Subsequently, the pair of intermediate members 4 respectively connected to the pair of element electrode wires 23 are bonded to the respective pair of leads 3. Each intermediate member 4 and the corresponding lead 3 are juxtaposed in a radial direction perpendicular to the extending direction X. The intermediate member 4 is bonded to the corresponding lead 3 being overlapped with each other in the radial direction. In the present embodiment, the intermediate members 4 are bonded to the respective leads 3 by laser welding. In the present embodiment, the number of the bonding portions 5 is two in bonding each of the intermediate members 4 to the corresponding one of the leads 3 by laser welding. Preferably, the number of bonding portions is about two to four. In this case, the strength of bonding the intermediate members 4 to the leads 3 can be improved.

As shown in FIG. 4, in a state where the element electrode wires 23, the intermediate members 4, and the leads 3 are respectively bonded to each other, a length L1 of a portion of each element electrode wire 23 protruding in the extending direction X from the temperature detector 2 toward the corresponding lead 3 is L1=0.5 mm. The element side bonding portion 51 bonding each element electrode wire 23 to the corresponding intermediate member 4 is located at a position nearer the temperature detector 2 than the tip end portion of the corresponding lead 3 is. A distance L2 from the element side bonding portion 51 to the tip end portion of the lead 3 is L2=0.5 mm.

The following description addresses the advantageous effects of the present embodiment.

In the temperature sensor 1, each element electrode wire 23 and the corresponding intermediate member 4 are arranged in alignment with each other in the extending direction X, and are bonded to each other, with the opposing surfaces 231 and 41 facing in the extending direction X being abutted with each other. The opposing surfaces 231 and 41 are ends of the element electrode wire 23 and the intermediate member 4, respectively, in the extending direction X. The region of the element side bonding portion 51 is smaller, compared with the case where the element electrode wire 23 is bonded to the corresponding lead 3 through an outer peripheral surface parallel to the extending direction X. Thus, the thermal expansion difference between the element electrode wire 23 and the intermediate member 4 can be reduced, thereby reducing stress.

Making the region of the element side bonding portion 51 small, the opposing surfaces 231 and 41 of the element electrode wire 23 and the intermediate member 4, respectively, can be entirely easily bonded to each other. Thus, only the portion bonding the element electrode wire 23 to the intermediate member 4 is formed on the opposing surfaces 231 and 41, reducing concentration of stress. As described above, if the material forming the element electrode wires 23 is different from that forming the intermediate members 4, stress can be reduced.

The leads 3 and the intermediate members 4 are both formed of an Fe-based alloy. Forming the leads 3 using the same material as that of the intermediate members 4, bonding can be easily conducted and bonding strength can be improved. Since materials having thermal expansion coefficients approximate to each other are selected for the leads 3 and the intermediate members 4, stress generated by thermal expansion due to change of temperature can be reduced.

The temperature detector 2 is accommodated in the cover member 61, while the temperature detector 2 and the cover member 61 are secured by the filler 62 filled in the cover member 61. Thus, with the temperature detector 2 being secured, stress, which is generated between each element electrode wire 23, the corresponding intermediate member 4, and the corresponding lead 3, can be reduced.

In the extending direction X, the length L1 of the portion of each element electrode wire 23 protruding from the temperature detector 2 toward the corresponding lead 3 satisfies the relation $0.2\ mm \leq L1 \leq 8$ mm. Thus, bending is prevented from occurring when the element electrode wires 23 are bonded to the respective intermediate members 4, while the stress applied to the element electrode wires 23 is reduced when the temperature detector 2 is swayed. Moreover, the influence of dimensional variations in forming the temperature detector 2 can be reduced.

In the extending direction X, the element side bonding portion 51 bonding each element electrode wire 23 to the corresponding intermediate member 4 is located at a position nearer the temperature detector 2 than the tip end portion of the corresponding the lead 3 is. Further, the distance L2 from the element side bonding portion 51 to the tip end portion of the lead 3 satisfies the relation $0\ mm \leq L2 \leq 8$ mm. Thus, the stress applied to each element electrode wire 23, the corresponding intermediate member 4, and the corresponding lead 3 can be reduced.

The pair of element electrode wires 23 are formed of a Pt-based alloy doped with Ir. Thus, the heat resistance and strength of the element electrode wires 23 can be improved.

In a cross section perpendicular to the extending direction X, the outer shape of the intermediate member 4 is greater than the that of the corresponding element electrode wire 23, that is, the outer shape of the element electrode wire 23 is large enough to cover the outer shape of the intermediate member 4. When the element electrode wires 23 are formed of the Pt-based alloy, the melting point of the element electrode wires 23 becomes higher than that of the intermediate members 4. Therefore, in bonding the element electrode wires 23 to the respective intermediate members 4, the intermediate members 4 are easily molten and tapered. As described above, by making the outer shape of each intermediate member 4 large, the opposing surfaces 231 and 41 of the element electrode wire 23 and the intermediate member 4, respectively, are easily entirely bonded to each other if the intermediate members 4 are tapered.

The thermal expansion coefficient E1 of the thermosensitive element 21 is substantially equal to the thermal expansion coefficient E2 of the element electrode wires 23. Thus, when the temperature sensor 1 is heated and the thermosensitive element 21 and the element electrode wires 23 are thermally expanded, the stress applied to the thermosensitive element 21 and the element electrode wire 23 can be reduced.

The thermal expansion coefficient E3 of the intermediate members 4, which is intermediate between the thermal expansion coefficient E2 of the element electrode wires 23 and the thermal expansion coefficient E4 of the leads 3, satisfies the relation E2≤E3 ≤E4. Thus, when the temperature sensor 1 is heated, the thermal expansion difference between the element electrode wires 23 and the intermediate members 4 and the thermal expansion difference between the leads 3 and the intermediate members 4 can be reduced. Accordingly, the stress applied to the element electrode wires 23, the intermediate members 4, and the leads 3 can be reduced. In particular, when the leads 3 are formed of the same material as that of the intermediate members 4 and a relation E3=E4 is satisfied, the reliability of the lap-welded portion between each lead 3 and the corresponding intermediate member 4 can be improved.

As described above, according to the temperature sensor 1 of the present embodiment, with the use of the intermediate members 4, the concentration of stress across each element electrode wire 23 and the corresponding lead 3 can be reduced, improving reliability and strength of the connection.

As materials used for the pair of intermediate members 4 and the pair of leads 3, an Ni-based alloy can also be used, besides the Fe—Cr-based alloy mentioned in the present embodiment. The Ni-based alloy that can be used contains Ni as a base material and preferably contains 14 to 25 wt % Cr. As such an Ni—Cr-based alloy, NCF600, NCF601, or the like can be used.

As the element electrode wires 23, a Pt-based alloy containing Pt as a base material and doped with 5 to 15 wt % Rh can be used, besides the Pt-based alloy doped with Ir.

(Confirmatory Test)

In the present confirmatory test, a thermal cycle test, a thermal shock test, and a vibration test were conducted using samples 1 to 6.

Samples 1 and 2 had structures similar to the structure of the temperature sensor 1 of the first embodiment. The element electrode wires 23 of the temperature sensor 1 in sample 1 were formed of a Pt-based alloy doped with Rh. The element electrode wires 23 of the temperature sensor 1 in sample 2 were formed of a Pt-based alloy doped with Ir.

The temperature sensors 1 of samples 3 to 6 had no intermediate members 4, with the element electrode wires 23 being directly bonded to the respective leads 3. The element electrode wires 23 of the temperature sensors 1 of samples 3 and 5 were formed of a Pt-based alloy doped with Rh. The element electrode wires 23 of the temperature sensors 1 in samples 4 and 6 were formed of a Pt-based alloy doped with Ir. In samples 3 and 4, the filler 62 was not filled in the cover member 61.

In samples 1 to 6, portions other than the above-described portions were structured similarly to the temperature sensor 1 of the first embodiment.

In the thermal cycle test, samples 1 to 6 were each alternately moved between a room temperature atmosphere and a high temperature atmosphere. The thermal cycle test was conducted using two test temperatures of 800° C. and 900° C. as the high temperature atmosphere. In the test, 1 cycle was taken to be holding samples 1 to 6 in each of the atmospheres for 2 minutes. 10,000 cycles were conducted.

In the thermal shock test, samples 1 to 6 were heated and then rapidly cooled by use of a blower. In the present embodiment, samples 1 to 6 were heated at a temperature of 800° C., followed by cooling the temperature sensors 1 at a cooling rate of 100° C. per second and a cooling rate of 200° C. per second. In the test, one cycle was taken to be a set of heating and cooling. 10,000 cycles were conducted.

In the vibration test, samples 1 to 6 were disposed in a high temperature atmosphere with an imposition of a vibration load. The vibration acceleration applied to samples 1 to 6 was in two patterns of 30 G and 40 G, and oscillation frequency was swept centering on the resonance point of the temperature detector 2. The test was continued for 100 hours.

TABLE 1

|  | Thermal cycle test | | Thermal shock test | | Vibration Test | |
| --- | --- | --- | --- | --- | --- | --- |
|  | 800° C. | 900° C. | 100° C./s | 200° C./s | 30 G | 40 G |
| Sample 1 | Good | Good | Good | Good | Good | Good |
| Sample 2 | Good | Good | Good | Good | Good | Good |
| Sample 3 | Good | Good | Good | Good | Abnormal | Abnormal |
| Sample 4 | Good | Good | Good | Good | Abnormal | Abnormal |
| Sample 5 | Good | Abnormal | Good | Abnormal | Good | Abnormal |
| Sample 6 | Good | Good | Good | Abnormal | Good | Good |

Table 1 shows the results of the thermal cycle test, thermal shock test, and vibration test of samples 1 to 6. The "abnormal" shown in the drawing indicates that abnormality was observed after the test, and "good" indicates that the sample was still in normal conditions after the test.

The bonding state of the element electrode wires 21, the intermediate members 4, and the leads 3 of samples 1 and 2 was normal after any of the heating-cooling, thermal shock, and vibration tests. In the bonding state of the element electrode wires to the leads of samples 3 and 4, abnormality was observed after the vibration test at vibration accelerations of 30 G and 40 G.

In the bonding state of the element electrode wires to the leads of sample 5, abnormality was observed after the thermal cycle test between room temperature atmosphere and 900° C. atmosphere, after the thermal shock test at a cooling rate of 200° C. per second, and after the vibration test at a vibration acceleration of 40 G.

In the bonding state of the element electrode wires to the leads of sample 6, abnormality was observed after the thermal shock test at a cooling rate of 200° C. per second.

In this way, according to the temperature sensor 1 of the first embodiment, it was confirmed that the concentration of stress across each element electrode wire 23 and the corresponding lead 3 could be reduced and reliability of strength could be improved.

(Second Embodiment)

Figure 5:
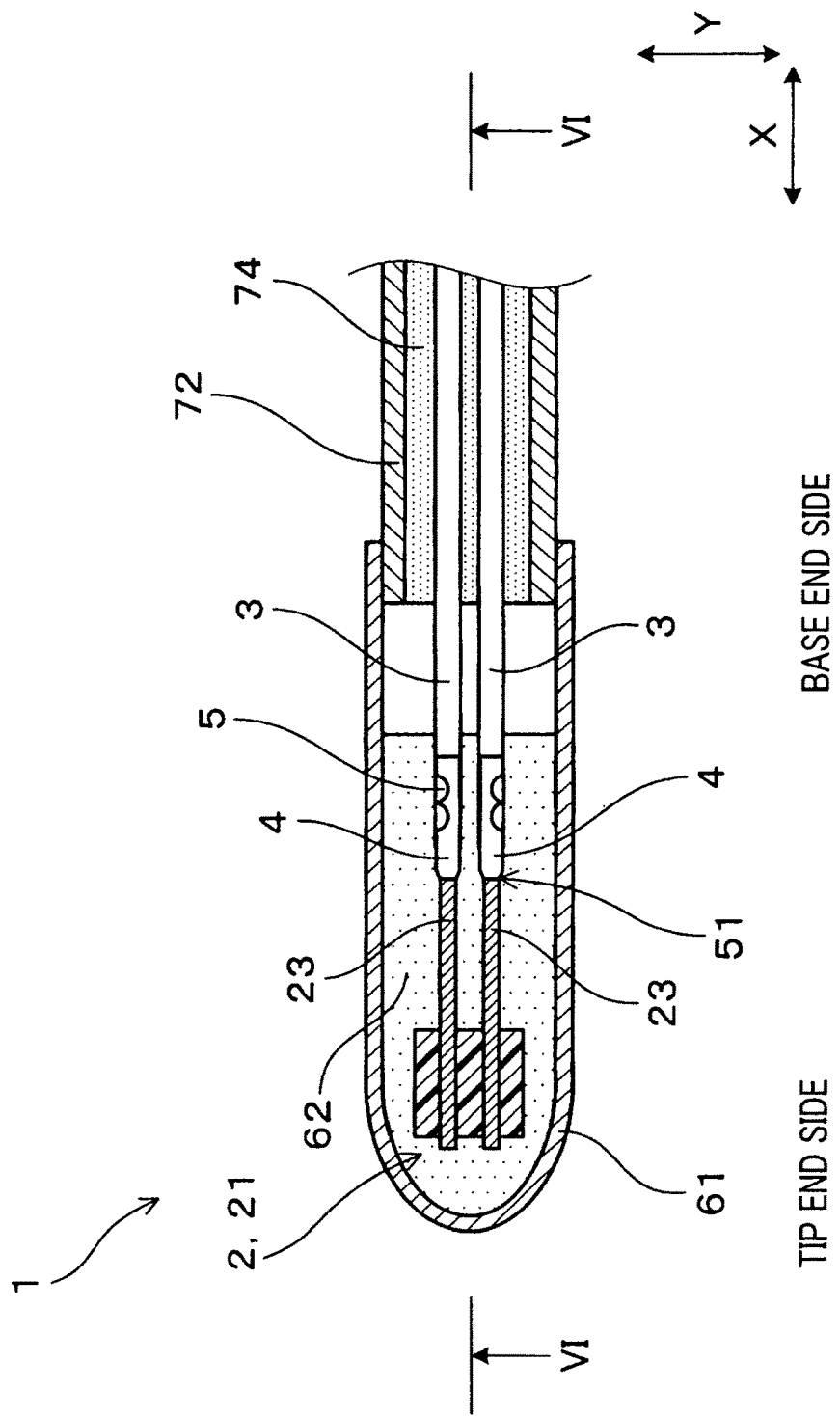
FIG. 5 is a cross-sectional view of a tip end of a temperature sensor according to a second embodiment.
Figure 6:
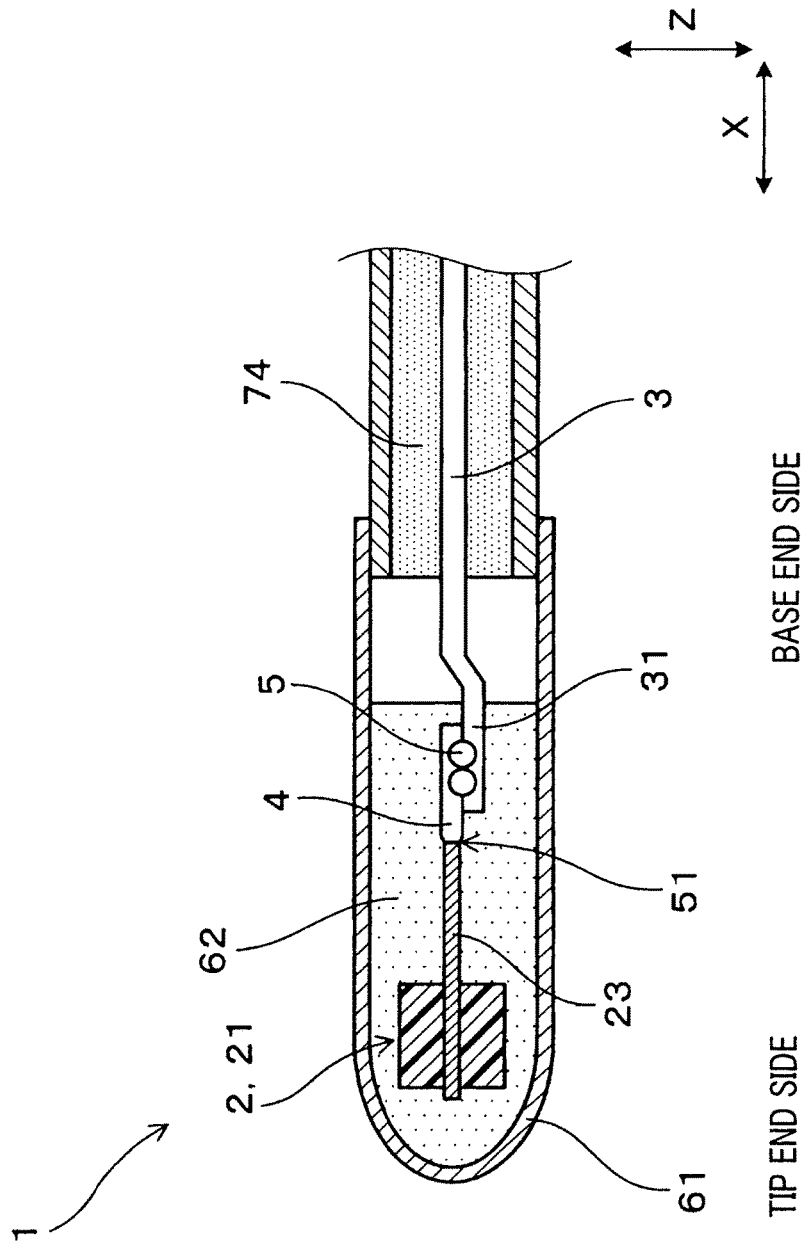
FIG. 6 is a cross-sectional view taken along the line VI-VI of FIG. 5.

As shown in FIGS. 5 and 6, in the present embodiment, the structure of the temperature sensor 1 of the first embodiment is partially modified.

A temperature sensor 1 of the present embodiment includes a temperature detector 2 formed of a thermosensitive element 21 in a substantially cubic shape. Respective portions on a tip end side of element electrode wires 23 are embedded in the thermosensitive element 21.

The rest of the structure is similar to that of the first embodiment. Of the reference signs used in the present embodiment or the drawings of the present embodiment, the reference signs identical with those which are used in the first embodiment represent components similar to those of the first embodiment, unless otherwise specified.

In the present embodiment as well, advantageous effects similar to those of the first embodiment can be obtained.

REFERENCE SIGNS LIST

1 Temperature sensor
2 Temperature detector
21 Thermosensitive element
23 Element electrode wire
3 Lead
4 Intermediate member

What is claimed is:

1. A temperature sensor comprising:
a temperature detector including a thermosensitive element for detecting a temperature;
a pair of element electrode wires made of a noble metal or a noble metal alloy, the pair of element electrode wires being formed so as to have respective ends embedded in the temperature detector and other respective ends extended in the same direction;
a pair of leads made of an Ni-based alloy or an Fe-based alloy, the pair of leads being formed so as to be electrically connected to the respective element electrode wires and extend in an extending direction of the respective element electrode wires; and
a pair of intermediate members made of an Ni-based alloy or an Fe-based alloy, the pair of intermediate members being formed so as to electrically connect the element electrode wires to respective leads and extend in the extending direction, wherein:
each of the element electrode wires and a corresponding one of the intermediate members are arranged being aligned in the extending direction, and bonded to each other in a state where mutually facing opposing surfaces are abutted with each other; and
each of the intermediate member and a corresponding one of the leads are juxtaposed in a direction perpendicular to the extending direction and bonded being overlapped with each other.

2. The temperature sensor according to claim 1, wherein:
the temperature detector is accommodated in a cover member; and
the temperature detector and the cover member are secured by a filler filled in the cover member.

3. The temperature sensor according to claim 1, wherein in the extending direction, a length L1 of a portion of each of the element electrode wires protruding from the temperature detector toward a corresponding one of the leads satisfies a relation 0.2 mm≤L1≤8 mm.

4. The temperature sensor according to claim 1, wherein in the extending direction, an element side bonding portion bonding each of the element electrode wires to a corresponding one of the intermediate members is located at a position nearer the temperature detector than a tip end portion of a corresponding one of the leads is; and
a distance L2 from the element side bonding portion to the tip end portion of the lead satisfies a relation 0 mm≤L2≤8 mm.

5. The temperature sensor according to claim 1, wherein the pair of element electrode wires are formed of a Pt-based alloy doped with Rh or Ir.

6. The temperature sensor according to claim 5, wherein in a cross section perpendicular to the extending direction, an outer shape of each of the intermediate members is greater than an outer shape of a corresponding one of the element electrode wires; and
the outer shape of the intermediate member is large enough to cover the outer shape of the element electrode wire.

7. The temperature sensor according to claim 1, wherein a thermal expansion coefficient E1 of the thermosensitive element is equal to a thermal expansion coefficient E2 of the element electrode wire.

8. The temperature sensor according to claim 1, wherein a thermal expansion coefficient E3 of the intermediate members is intermediate between the thermal expansion coefficient E2 of the element electrode wires and a thermal expansion coefficient E4 of the leads, and satisfies a relation E2≤E3≤E4.

9. The temperature sensor according to claim 1, wherein the intermediate members and the leads are formed of the same material.

10. The temperature sensor according to claim 1, wherein each of element electrode wires is bonded to a corresponding one of the intermediate members by welding, and each of the intermediate member is bonded to a corresponding one of the leads by welding.

* * * * *